(12) United States Patent
Shirakawa

(10) Patent No.: US 7,076,526 B2
(45) Date of Patent: Jul. 11, 2006

(54) ELECTRONIC MAIL TRANSFER DEVICE, TERMINAL AND SYSTEM HAVING THE DEVICE, AND TELEPHONE NUMBER TRANSFER DEVICE, EXCHANGE, TELEPHONE AND SYSTEM HAVING THE DEVICE

(75) Inventor: Takahisa Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 762 days.

(21) Appl. No.: 09/878,292

(22) Filed: Jun. 12, 2001

(65) Prior Publication Data

US 2001/0051990 A1    Dec. 13, 2001

(30) Foreign Application Priority Data

Jun. 13, 2000    (JP)    ............................. 2000-176988

(51) Int. Cl.
    *G06F 15/16*    (2006.01)
(52) U.S. Cl. .................... 709/206; 709/207; 709/219; 709/238; 709/239; 709/245; 709/249
(58) Field of Classification Search ................ 709/200, 709/206, 207, 238, 239, 219, 245, 249; 707/3
    See application file for complete search history.

(56) References Cited

U.S. PATENT DOCUMENTS

| 6,643,687 B1 * | 11/2003 | Dickie et al. ............... 709/206 |
| 6,721,784 B1 * | 4/2004 | Leonard et al. ............ 709/206 |
| 2004/0230566 A1 * | 11/2004 | Balijepalli et al. ............. 707/3 |

* cited by examiner

*Primary Examiner*—Yves Dalencourt
(74) *Attorney, Agent, or Firm*—Whitham, Curtis, Christofferson & Cook P.C.

(57) ABSTRACT

A mail transfer device for relaying an electronic mail transmitted from a transmission terminal through a communication line and transferring the electronic mail thus relayed to a reception terminal is equipped with devices for converting to another address the electronic mail address of the transmission source of the mail which is transmitted from the transmission terminal though the communication line and then transferring the electronic mail to the reception terminal; and devices for converting the address of the transmission destination of a reply mail to the address of the transmission source before the address conversion and then transferring the replay mail to the transmission terminal when the reply mail to the electronic mail is transmitted from the reception terminal.

9 Claims, 2 Drawing Sheets

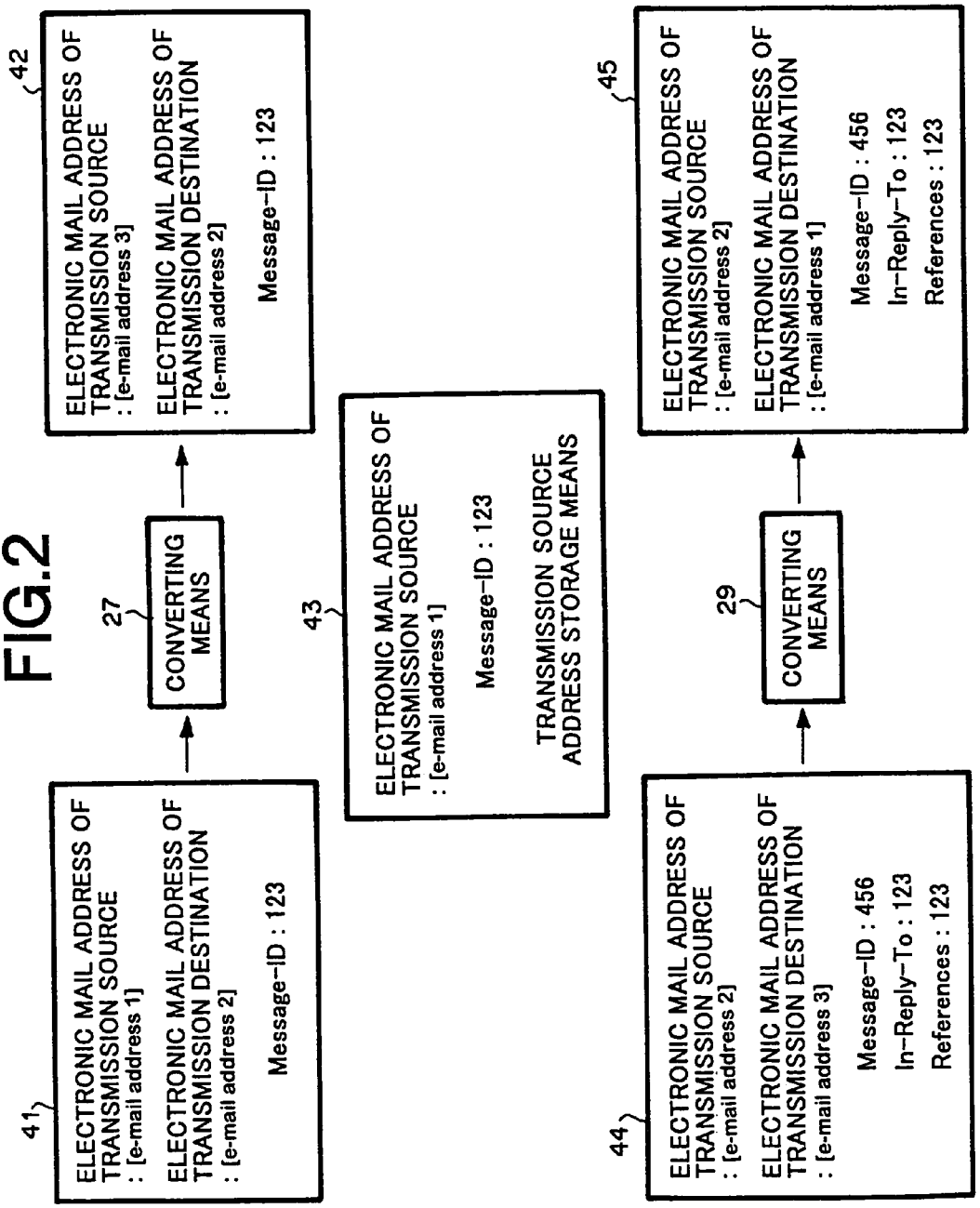

ELECTRONIC MAIL TRANSFER DEVICE, TERMINAL AND SYSTEM HAVING THE DEVICE, AND TELEPHONE NUMBER TRANSFER DEVICE, EXCHANGE, TELEPHONE AND SYSTEM HAVING THE DEVICE

BACKGROUND OF THE INVENTION

1. Field of the Invention

The present invention relates to an electronic mail transfer device for relaying an electronic mail transmitted and transferring the electronic mail thus relayed to plural reception terminals and a system having the electronic mail transfer device, and a telephone number transfer device for relaying a telephone number allocated to a telephone at a call originating side and transferring the telephone number thus relayed to a telephone at a call receiving side and a system having the telephone number transfer device.

2. Description of the Related Art

Cellular phones that can transmit/receive electronic mails through the Internet have recently become pervasive. In connection with the pervasion of such cellular phones, services of transmitting various information such as position information, vacancy situation information or the like of hospitals, hotels, transportations, restaurants, amusement centers or the like are provided to clients having cellular phones through Webs, and services of receiving reservations of hotels, restaurants, amusement centers or the like through electronic mails are provided to clients having cellular phones.

When various services as described above are provided, a client transmits his/her name, cellular phone number and electronic mail address with which the client is specified, and his/her desired service content to an information providing side in an electronic form. The information providing side which receives these information pieces specifies a service to be provided to the client and provides the service thus specified to the client, whereby the client is provided with the his/her desired service.

Further, there is an electronic mail transfer-service of transmitting electronic mails for pay or at no charge under the condition that users watch advertisements. In the electronic mail transfer-service, when a user obtains a new electronic mail address in addition to his/her primary mail address which has been hitherto used, and transmits an electronic mail by using the new electronic mail address in place of the primary mail address, an electronic mail transmitted to the new electronic mail address is transferred to the primary mail address.

However, when information to be transmitted/received between a client and a service provider is transmitted/received in an electronic form, the electronic mail address may be leaked from one of plural transmission routes for electronic mails, or if a receiver who receives an electronic mail informs another person about the electronic mail address of the transmitter of the electronic mail, an electronic mail may be mischievously transmitted to the transmitter by the other person or an undesired electronic mail such as an advertisement mail from an enterprise may be transmitted. Accordingly, if clients receive such undesired electronic mails, these electronic mails would be unintentionally stocked and thus the clients could not receive important electronic mails. If things come to the worst, it may be needed for the clients to change their electronic mail addresses.

Besides, it may be considered that a client is provided with an electronic mail transfer-service for the time being and if undesired electronic mails are mischievously stocked, the client cancels his/her electronic mail address. However, in this case, there occurs a case where the client cannot obtain important information mailed to the electronic mail address thus canceled.

SUMMARY OF THE INVENTION

Therefore, an object of the present invention is to provide an electronic mail transfer device and an electronic mail transfer system which can keep secrecy of electronic mail addresses.

Further, another object of the present invention is to provide a telephone number transfer device and a telephone number transfer system which can keep secrecy of telephone numbers.

In order to attain the above objects, according to a first aspect of the present invention, an electronic mail transfer device for relaying an electronic mail transmitted from a transmission terminal through a communication line and transferring the electronic mail thus relayed to a reception terminal, comprising: means for converting to another electronic mail address the electronic mail address of the transmission source of the electronic mail which is transmitted from the transmission terminal through the communication line and then transferring the electronic mail to the reception terminal; and means for converting the address of a transmission destination of a reply electronic mail to the address of the transmission source before the address conversion and then transferring the reply electronic mail to the transmission terminal when the reply electronic mail to the electronic mail is transmitted from the reception terminal.

According to a second aspect of the present invention, a mail transfer system is characterized by including the electronic mail transfer device, a transmission terminal for transmitting an electronic mail to the electronic mail transfer device and a reception terminal for receiving an electronic mail transmitted from the electronic mail transfer device.

According to a third aspect of the present invention, A telephone number transfer device for relaying the notification of the telephone number allocated to the telephone at a call originating side and then transferring the notification to the telephone of a call receiving side, comprising: means for converting the telephone number allocated to the telephone at the call originating side to another telephone number and then transferring the notification of the another telephone number to the telephone at the call receiving side; and means for transferring a reply call to the call originating side when the reply call is transmitted from the call receiving side to the another telephone number.

Further, according to a fourth aspect of the present invention, a telephone number transfer system is characterized by including the telephone number transfer device, a telephone or exchange at a call originating side which originates a telephone number to the telephone number transfer device, and a telephone at a call receiving side which receives a telephone number replied from the telephone number transfer device.

The transmission terminal of the present invention transmits an electronic mail through the communication line to the mail transfer device.

The reception terminal of the present invention receives an electronic mail transmitted from the mail transfer device through the communication line.

Further, the telephone of the present invention informs a telephone number to the telephone number transfer device.

The telephone of the present invention receives a telephone number transferred from the telephone number transfer device.

BRIEF DESCRIPTION OF THE DRAWINGS

FIG. 2 is a diagram showing an electronic mail handled in the electronic mail transfer system shown in FIG. 1 and information stored in transmission source address storage means.

DETAILED DESCRIPTION OF THE PREFERRED EMBODIMENTS

Figure 1:
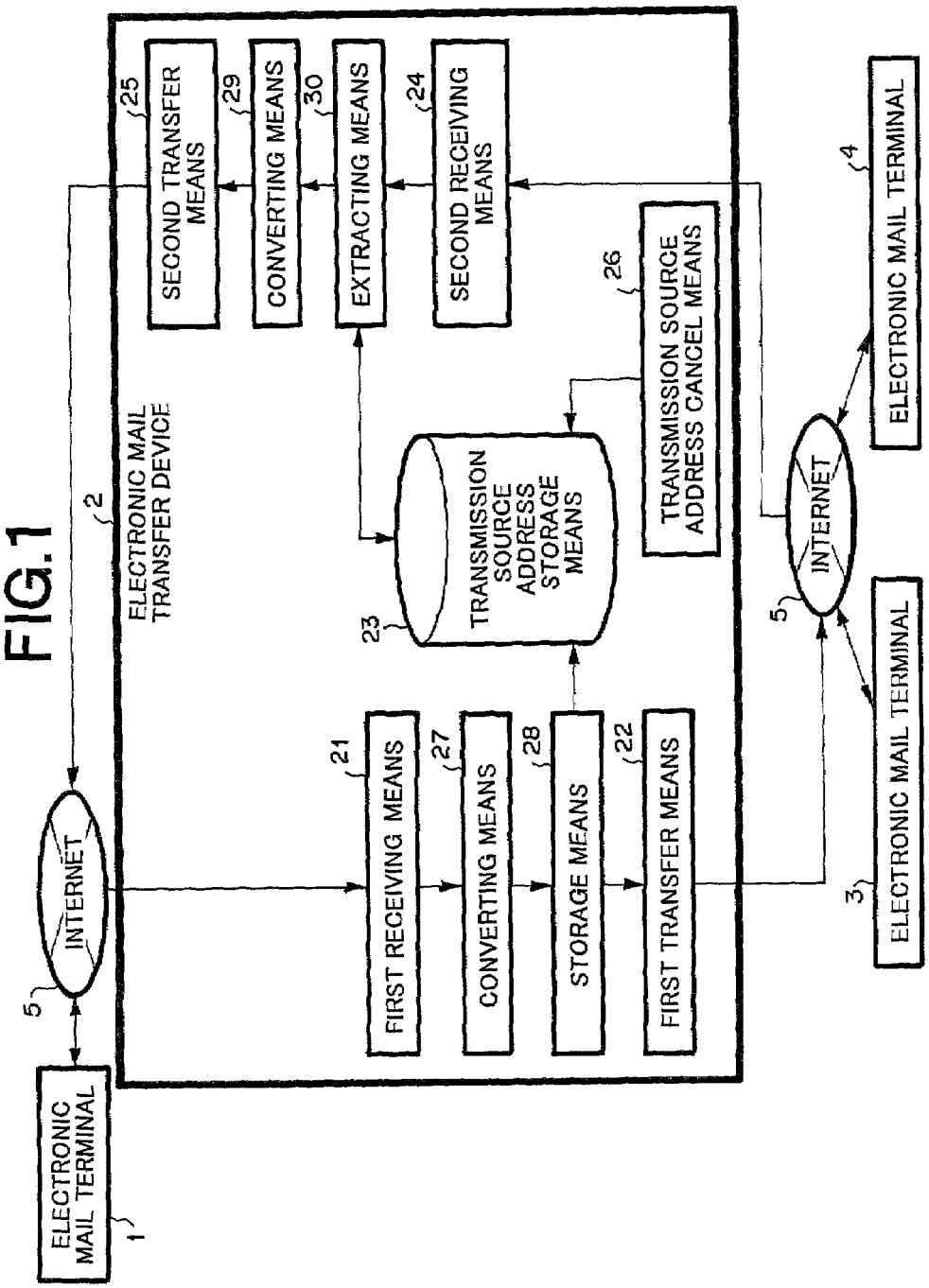
FIG. 1 is a diagram showing the construction of an electronic mail transfer system according to the present invention.

Preferred embodiments according to the present invention will be described hereunder with reference to the accompanying drawings.

FIG. 1 is a diagram showing the construction of an electronic mail transfer system according to the present invention.

In FIG. 1, the electronic mail transfer system has each of electronic mail transfer terminals 1, 3 and 4 for transmitting/receiving electronic mails, and electronic mail transfer device 2 for transferring an electronic mail transmitted from one electronic mail terminal to another electronic mail terminal. The electronic mail transfer terminals 1, 3 and 4 are connected to the electronic mail transfer device 2 through a communication line (a network) such as Internet 5 or the like. A personal computer and a mobile telephone such as a cellular phone or the like may be used as each of the electronic mail terminals 1, 3 and 4.

The electronic mail transfer device 2 is equipped with first receiving means 21 for receiving an electronic mail transmitted from the electronic mail terminal 1 and adding a message ID to the electronic mail, converting means 27 for converting the electronic mail address of the transmission source of the electronic mail thus received to an electronic mail address allocated to the electronic mail transfer device 2, storage means 28 for associating the electronic mail address of the transmission source with the message ID and storing them into transmission source address storage means (memory) 23 implemented by HDD (Hard Disc Drive) or the like, and first transfer means 22 for transmitting an electronic mail that the electronic mail address of the transmission source is converted, through the Internet 5 to the electronic mail terminal 3 or the like according to the address of a transmission destination.

Further, the electronic mail transfer device 2 is equipped with second receiving means 24 for receiving a reply electronic mail to an electronic mail transferred by the first transfer means 22, extracting means 30 for extracting information such as an electronic mail header, etc. of the transmission destination of the reply electronic mail, converting means 29 for referring to transmission source address storage means 23 on the basis of the information such as the electronic mail header thus extracted and converting the electronic mail address to the primary electronic mail address of the reply destination of the reply electronic mail, second transfer means 25 for transmitting through the Internet 5 the electronic mail after the electronic In the converting means 27, by combining the electronic mail address and the message ID with each other, an electronic mail added with an electronic mail address which is varied with every transmission destination of the electronic mail may be transferred by using the first transfer means 22.

Further, the operations of the first and second receiving means 21, 24 and the second transfer means 22, 25 are controlled by a computer (not shown) or the like.

FIG. 2 is a diagram showing "electronic mail address of transmission source", "electronic mail address of transmission destination", "message ID (Message-ID:)", "In-Reply-To", "References:", etc. of an electronic mail handled in the electronic mail transfer system shown in FIG. 1, and information stored in the transmission source address storage means 23. The operation of the electronic mail transfer system shown in FIG. 1 will be described with reference to FIG. 2 by using a case where an electronic mail is transmitted from the electronic mail terminal 1 to the electronic mail terminal 3.

First, when a client transmits to the electronic mail terminal 3 an electronic mail for which an electronic mail address [e-mail address 1] allocated to the electronic mail terminal 3 is input to the electronic mail address of transmission source and an electronic mail address [e-mail address 2] allocated to the electronic mail terminal 3 is input to the electronic mail address of transmission destination, the electronic mail concerned is received by the first receiving means 21 of the electronic mail transfer device 2.

In the first receiving means 21, as shown in FIG. 2, "123" is added as "message ID" to electronic mail received, and then electronic mail 41 added with "123" is output to the converting means 27. The converting means 27 converts the electronic mail address of the transmission source added to the input electronic mail to the electronic mail address of the electronic mail transfer device 2 or the electronic mail address of the combination of the electronic mail address before the conversion and the message ID. Inn this case, the converting means 27 converts the electronic mail address of transmission source [e-mail address 1] of the electronic mail 41 to the electronic mail address of transmission source [e-mail address 3] of the electronic mail 42.

The electronic mail address before the conversion [e-mail address 1] and the electronic mail 42 after the electronic mail address is converted are output to the storage means 28. In the storage means 28, the electronic mail address before the conversion [e-mail address 1] and the mail number such as "123" corresponding to Message-ID: added to the electronic mail are stored in the transmission source address storage means 23 as information 43 while they are associated with each other.

Further, a table memory may be used as the transmission source address storage means 23, and the electronic mail address [e-mail address 1] and the newly-added electronic mail address [e-mail address 3] may be stored in association with each other. In this case, as described above, [e-mail address 1] may be extracted by referring to the transmission source address storage means 23 on the basis of [e-mail address 3].

The electronic mail 42 after the conversion is output to the first transfer means 22. The first transfer means 22 transfers the electronic mail 42 on the basis of the electronic mail address of the transmission destination of the electronic mail 42. In this case, since the electronic mail address of the transmission destination is the electronic mail address of the electronic mail terminal 3, the electronic mail 42 is transferred to the electronic mail terminal 3.

Thereafter, when a reply mail to the electronic mail 42 is transmitted from the electronic mail terminal 3, it is added with the electronic mail address [e-mail address 3] allocated to the electronic mail transfer device 2 in the electronic mail terminal 3, transmitted to the electronic mail transfer device 2, and received by the second receiving means 24. In the second receiving means 24, "456", "123" and "123" are added as message ID", "In-Reply-To" and "References:" respectively to the electronic mail received.

This electronic mail 44 which "456", "123" and "123" are added is output to the extracting means 30. When the electronic mail 44 is input to the extracting means 30, in order to identify an electronic mail terminal to which the electronic mail is addressed, information such as "In-Reply-To:" or "References:" of the electronic mail header of the electronic mail address of the transmission destination of the electronic mail is extracted, and the transmission source address storage means 23 is referred to on the basis of the extracted information.

Here, as shown in FIG. 2, "123" corresponding to "message ID" and [e-mail address 1] corresponding to "electronic address of transmission source" before the alteration are stored in association with each other in the transmission source address storage means 23. "123" which is the same as "message ID" is added to "In-Reply-To", etc., and thus [e-mail address 1] corresponding to "electronic mail address of transmission source" before the alteration is extracted on the basis of "In-Reply-To" or the like.

[E-mail address 1] corresponding to the "electronic mail address of transmission source" thus extracted is output to the converting means 29. As shown in FIG. 2, the converting means 29 converts [e-mail address 3] corresponding to "electronic mail address of transmission destination" of the reply electronic mail 44 to [e-mail address 1] corresponding to "electronic mail address of transmission source" extracted. Thereafter, the electronic mail 45 for which the electronic mail address of the transmission destination is altered is output to the second transfer means 25.

The second transfer means 25 transmits the input electronic mail 45 through the Internet 5 to the electronic mail address of the transmission destination after the conversion. In this case, since [e-mail address 1] corresponding to the electronic mail address of the transmission destination after the conversion is the electronic mail address of the electronic mail terminal 1, the input electronic mail 45 is transferred to the electronic mail terminal 1. By transmitting/receiving the electronic mail according to the procedure as described above, the electronic mail can be transferred while the electronic mail address of the electronic mail terminal 1 is prevented from being leaked to the electronic mail terminal 3 corresponding to the transmission destination.

Further, when electronic mails are transferred by the first transfer means 21, the transmission source address cancel means 26 would cancel the electronic mail address of the electronic mail terminal 1 stored in the transmission source address storage means 23 if much time elapses since the electronic mail address of the electronic mail terminal 1 was stored in the transmission source address storage means 23 or no reply electronic mail is input to the second transfer means 25.

Still further, even when an electronic mail terminal 4 unjustly transmits an electronic mail having an electronic mail header that is forged so as to have the same "In-Reply-To:" and "References:" as an electronic mail transmitted from the electronic mail terminal 1 to the electronic mail terminal 3 as if the electronic mail is transmitted as a reply fro the electronic mail terminal 3, the transmission destination address of this electronic mail is canceled from the transmission source address storage means 23 by the transmission source address cancel means 26 if a predetermined number or more of electronic mails are transmitted as reply electronic mails or if a predetermined time period elapses from the time when an electronic mail is transmitted from the electronic mail terminal 1 to the electronic mail terminal 3. Therefore, electronic mails transmitted mischievously are prevented from being transferred to the electronic mail terminal 1.

When the transmission destination address of the electronic mail is canceled from the transmission source address storage means 23 and then a reply electronic mail is transmitted to the transmission destination address thus canceled from the transmission source storage means 23, the reply electronic mail concerned is returned as an error mail to the electroniuc mail terminal of the transmission source.

Further, in this embodiment, a different electronic mail address is allocated every electronic mail to be transmitted. Therefore, even when an electronic mail is transmitted from the electronic mail terminal 1 to both the electronic mail terminals 3,4 and the information on the electronic mail terminal 3 is canceled from the transmission source address storage means 23, a reply electronic mail transmitted from the electronic mail terminal 4 in response to the electronic mail transmitted to the electronic mail terminal 4 can be received at the electronic mail terminal 1.

Accordingly, even when an electronic mail is transmitted from a transmission source (for example, electronic mail terminal 1) to plural electronic mail terminals and then the electronic mail address of the transmisison source of this electronic mail is leaked to other sides through a route, so that reply electronic mails are transmitted from the other sides (undesired sides) to the electronic mail address of the transmission source concerned, reply electronic mails transmitted from transmission destinations (desired sides) to which the electronic mail is normally transmited without being leaked to the other sides are allowed to be transmitted to the transmission souce concerned (the electronic mail terminal 1), but reply electronic mails that are transmitted mischievously from the undesired sides are prevented from being transmitted to the transmission source (electronic mail terminal 1).

OTHER EMBODIMENTS

In the above embodiment, the first and second receiving means 21, 24 are disposed in the electronic mail transfer device 2, and also the first and second transfer means 22, 25 are individually provided. However, these means may be provided as a single means Further, when an unjust electronic mail is transmitted as a reply from an electronic mail terminal other than the electronic mail terminal 3, the electronic mail address of the transmission destination of the reply electronic mail may be canceled from the transmission source address storage means 23 on the basis of an instruction from the electronic mail terminal 1 by the transmission source address cancel means 26.

Further, in the above embodiment, the electronic mail is transmitted/received between the electronic mail terminal 1 and each of the electronic mail terminals 3, 4. However, even when a calling number notification of a telephone is transmitted/received between telephones, it may be transferred in the same manner.

That is, for example in a case where when a client (a call originating side) makes a telephone call to an enterprise, it is required that in place of the calling telephone number of the client, a virtual calling telephone number is notified to the enterprise side by the a telephone number transfer device side (corresponding to the electronic mail transfer device side) and then a return telephone call is made from the enterprise side, the virutal caling telepone number is used. At this time, the call is transferred through the telephone number transfer device to the telephone of the client. Accordingly, the return telephone call from the enterprise side can be received without informing the enterprise side about the telephone number actually allocated to the client.

In this case, the telephone number allocated to a telephone corresponding to the electronic mail terminal 1 and the telephone number allocated to a telephone number transfer device corresponding to the electronic mail transfer device 2 are stored in association with each other in the memory corresponding to the transmission source address storage means 23.

As described above, according to the present invention, in place of the address of the transmission source of a mail transmitted from a transmission terminal, different addresses are allocated to a plurality of respective reception terminals, whereby the transmission source address is converted and then the mail is transferred. Therefore, the transmission source address of the mail transmitted from the transmission terminal is converted to another address and then the mail is transferred to a reception terminal. Consequently, the secrecy of the address can be kept.

Further, according to the present invention, even when the address is leaked through one route and thus an undesired reply mail is mischievously transmitted, it is sufficient to make only the address thereof unused. Therefore, it is unnnecessary to alter the address every time an undesired mail is transmitted as a reply, and thus such a situation that useful information cannot be received because an undesired reply mail is transmitted can be prevented from occurring.

What is claimed is:

1. An electronic mail transfer device for relaying an electronic mail transmitted from a transmission terminal through a communication line and transferring the electronic mail thus relayed to a reception terminal, comprising:

means for converting an electronic mail address of the transmission source of the electronic mail which is transmitted from said transmission terminal through said communication line to another electronic mail address by combining the electronic mail address and information appending to the electronic mail, which is varied with every transmission destination, the information being generated at said electronic mail transfer device, and then transferring the electronic mail with the information to said reception terminal; and means for converting the address of a transmission destination of a reply electronic mail to the address of the transmission source before the address conversion on the basis of the information appending to the reply electronic mail and then transferring the reply electronic mail to said transmission terminal when the reply electronic mail to the electronic mail is transmitted from said reception terminal.

2. The electronic mail transfer device as claimed in claim 1, further comprising:

means for storing the electronic mail address of the transmission source of the electronic mail transmitted from said transmission terminal and the information appending to the electronic mail in a memory while the electronic mail address and the information are associated with each other; and means for referring to said memory and extracting the electronic mail address of the transmission source of the electronic mail transmitted from said transmission terminal on the basis of the information appending to the reply electronic mail transmitted from said reception terminal.

3. The electronic mail transfer device as claimed in claim 1, wherein the another electronic mail address contains the address allocated to said electronic mail transfer device.

4. The electronic mail transfer device as claimed in claim 2 wherein the information appending to the electronic mail is a header of the electronic mail.

5. The electronic mail transfer device as claimed in claim 2, further comprising means for canceling the information appending to the electronic mail from said memory after a predetermined time elapses from the time when said transmission terminal transmits the electronic mail, or when the number of reply electronic mails exceeds a predetermined number, or on the basis of an instruction from said transmission terminal.

6. An electronic mail transfer system comprising:

said electronic mail transfer device as claimed in claim 1;

a transmission terminal for transmitting an electronic mail to said electronic mail transfer device; and a reception terminal for receiving an electronic mail transmitted from said electronic mail transfer device.

7. A transmission terminal for transmitting an electronic mail through a communication line to said electronic mail transfer device as claimed in claim 1.

8. A reception terminal for receiving an electronic mail transmitted from said electronic mail transfer device as claimed in claim 1 through a communication line.

9. An electronic mail transfer device for relaying an electronic mail transmitted from a transmission terminal through a communication line and transferring the electronic mail thus relayed to a reception terminal, comprising:

means for converting an electronic mail address of the transmission source of the electronic mail which is transmitted from said transmission terminal through said communication line to another electronic mail address by combining the electronic mail address and information appending to the electronic mail, the information being generated at said electronic mail transfer device, and then transferring the electronic mail with the information to said reception terminal; and means for converting the address of a transmission destination to a reply electronic mail to the address of the transmission source before the address conversion on the basis of the information appending to the reply electronic mail and then transferring the reply electronic mail to said transmission terminal when the reply electronic mail to the electronic mail is transmitted from said reception terminal.

* * * * *